United States Patent
Hocker et al.

[15] 3,677,653
[45] July 18, 1972

[54] LASER SENSITOMETER

[72] Inventors: Richard L. Hocker, 1110 Birch St., VAFB, Calif. 93437; Conrad P. Czerniejewski, 7550 Norwood Ave., Melbourne, Fla. 32901; John D. Hopper, 1389 Stanley Lane, Melbourne, Fla. 32935

[22] Filed: Oct. 23, 1970

[21] Appl. No.: 83,563

[52] U.S. Cl. .............................................. 356/256, 95/10 R
[51] Int. Cl. .......................................................... G01j 1/52
[58] Field of Search ................................ 356/201–203, 256; 95/10 R

[56] References Cited

UNITED STATES PATENTS 2,326,007   8/1943   Capstaff ............................... 356/202
3,556,664   1/1971   Blaisdell et al ..................... 356/203 X Primary Examiner—Ronald L. Wibert
Assistant Examiner—F. L. Evans
Attorney—Harry A. Herbert, Jr. and Arsen Tashjian

[57] ABSTRACT

A laser and a negative lens are used in a sensitometer to produce a diverging beam of coherent monochromatic light which is desirable in making sensitometric test strips from light-sensitive material that is being tested for resolution response.

1 Claim, 1 Drawing Figure

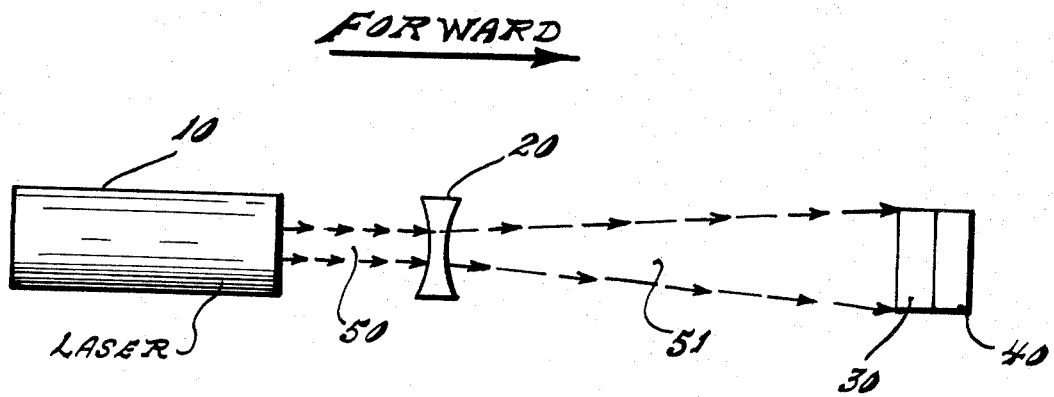

LASER SENSITOMETER

BACKGROUND OF THE INVENTION

This invention relates to photography and, more particularly, to a sensitometer.

Sensitometers are not, per se, novel. They are well known in the photographic art as apparatus for making sensitometric test strips from light-sensitive material to determine resolution response of the material. It may be fairly and accurately stated that a sensitometer comprises a light source and means for producing a graded series of exposures of the light-sensitive material being tested. Said means includes a step tablet or, as more popularly known, an optical wedge which in turn comprises a series of screens or steps, conventionally 21, of known absorbing power. The optical wedge is held in contact with the light-sensitive material being tested and a light of known intensity is directed onto the optical wedge. The steps of the optical wedge are equal in that each differs in density from the preceding one by an equal amount. Each step is given the same exposure, either individually or simultaneously. The result is a test strip of the light-sensitive material being tested, which is a positive of the optical wedge and from which, after development, the characteristics of the light-sensitive material may be determined.

Light sources used in sensitometers must be reproducible in intensity and in spectral distribution. In essence, a light source giving uniform illumination is necessary. Such light sources to-date have been either of the incandescent type, such as a tungsten filament electric lamp, or of the flash type, such as an electric flash lamp. Each source has severe disadvantages. With the use of tungsten filament lamps it is extremely difficult to control the quantity of light which is obtained and to control the spectral distribution of the light. The use of flash lamps requires complicated equipment, controls and adjustments, and does not provide for flexibility in time duration of the flash that would enable distribution of color balance in color film or of contrast in black and white film. Additionally, neither an incandescent light source nor a flash type light source can be used, even if combined with a narrow beam transmission filter, to obtain a beam narrower, i.e. less, than 10 Angstrom units. Further, if a beam that narrow could be obtained from a source of white light, the beam would not be bright enough at a short exposure time, e.g., 1 millisecond.

Our invention eliminates these disadvantages and, thereby, constitutes a significant advance in the state-of-the-art.

SUMMARY OF THE INVENTION

This invention pertains to a sensitometer wherein a laser and a negative lens forward of the laser are used as the means for producing a divergent coherent monochromatic light beam.

Therefore, the principal object of this invention is to provide novel apparatus for making sensiometric test strips from light-sensitive material.

Another object of this invention is to provide apparatus which is not subject to the disadvantages heretofore stated.

Still another object of this invention is to provide a sensitometric apparatus in which a coherent monochromatic light source is used.

Yet another object of this invention is to provide a sensitometer in which the light source includes a laser.

These, and other and related, objects of this invention will become readily apparent after a consideration of the description of the invention and reference to the drawing.

DESCRIPTION OF THE DRAWING

The drawing is a side elevation view, in simplified schematic form, of a preferred embodiment of the invention.

DESCRIPTION OF THE PREFERRED EMBODIMENT

With reference to the drawing, therein is shown, in a side elevation view and in schematic form, a preferred embodiment of our invention which includes means for producing a diverging beam of coherent monochromatic light and means for producing a graded series of exposures of the light-sensitive material being tested.

The means for producing a diverging beam of coherent monochromatic light includes means for emitting a beam of collimated coherent monochromatic light, such as laser 10, and means for diverging the beam of collimated coherent monochromatic light, such as negative lens 20 which is suitably positioned in front of i.e., forward of, laser 10.

The means for producing a graded series of exposures of the light-sensitive material being tested includes optical wedge 30 which is positioned in front of, i.e., forward of, negative lens 20.

Also shown in the drawing are light-sensitive material to be tested 40 which is forward of, and substantially in contact with, optical wedge 30; collimated coherent monochromatic light beam 50 emitted from laser 10; and diverging coherent monochromatic light beam 51. The direction of beam 50, and of rays thereof, and of diverging beam 51, and of rays thereof, is as indicated by the arrows on the representative rays. The directional designation "forward" or "front" is as indicated by the arrow in the drawing, i.e., to the reader's right.

MODE OF OPERATION OF THE PREFERRED EMBODIMENT

When it is desired to make a sensitometric test strip of a light-sensitive material, the light-sensitive material, such as 40, is placed in, or is otherwise brought into, surface-to-surface contact with optical wedge 30.

Laser 10 is then pumped and pulsed and emits collimated beam 50, the rays of which, by definition and by fact, are parallel. The beam 50, and the rays thereof, are diverged by negative lens 20 and impinge upon optical wedge 30. The diverged beam 51, and the rays thereof, then pass through the steps of various density of optical wedge 30 and impinge upon the front surface of light-sensitive material 40 which is being tested.

Light-sensitive material 40 is then developed by conventional means and the characteristics of the light-sensitive material 40 are determined by methods and apparatus already known in the art.

While there has been shown and described the fundamental features of the invention, as applied to a preferred embodiment, it is to be understood that various substitutions and omissions may be made by those of ordinary skill in the art without departing from the spirit of the invention. For example, a filter of the neutral density type may be interposed between negative lens 20 and optical wedge 30 to attenuate the energy level of divergent beam 51.

What we claim is:

1. A sensitometer for making sensitometric test strips from light-sensitive material being tested, comprising:
    a. means for producing a diverging beam of coherent monochromatic light, which includes:
        1. a laser emitting a beam of collimated coherent monochromatic light;
        2. and, a negative lens for diverging said beam of collimated coherent monochromatic light, wherein said negative lens is positioned forward of said laser emitting a beam of collimated coherent monochromatic light;
    b. and, means for producing a graded series of exposures of the light-sensitive material being tested, wherein said means includes an optical wedge and is positioned forward of said negative lens.

* * * * *